Patented Aug. 20, 1940

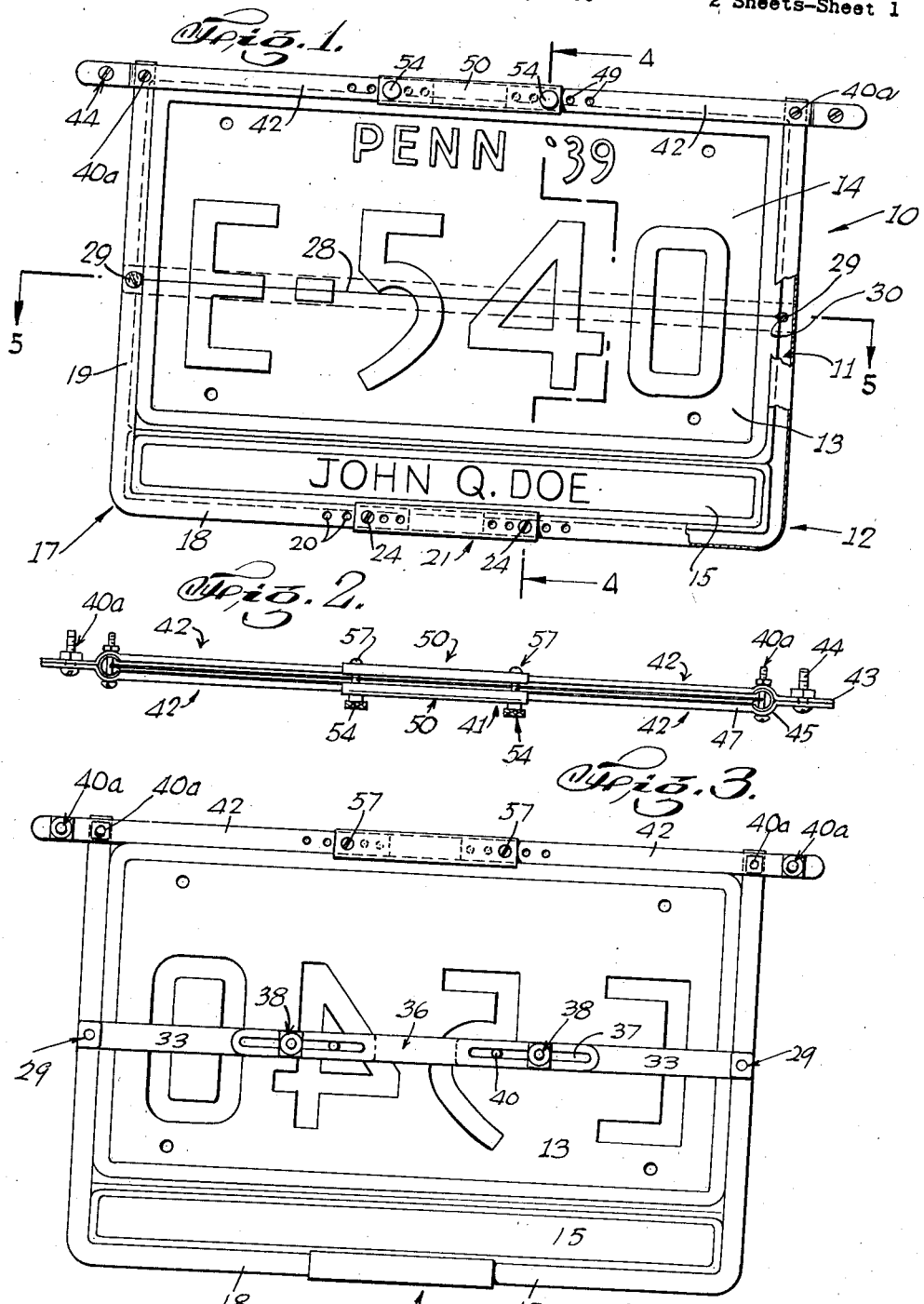

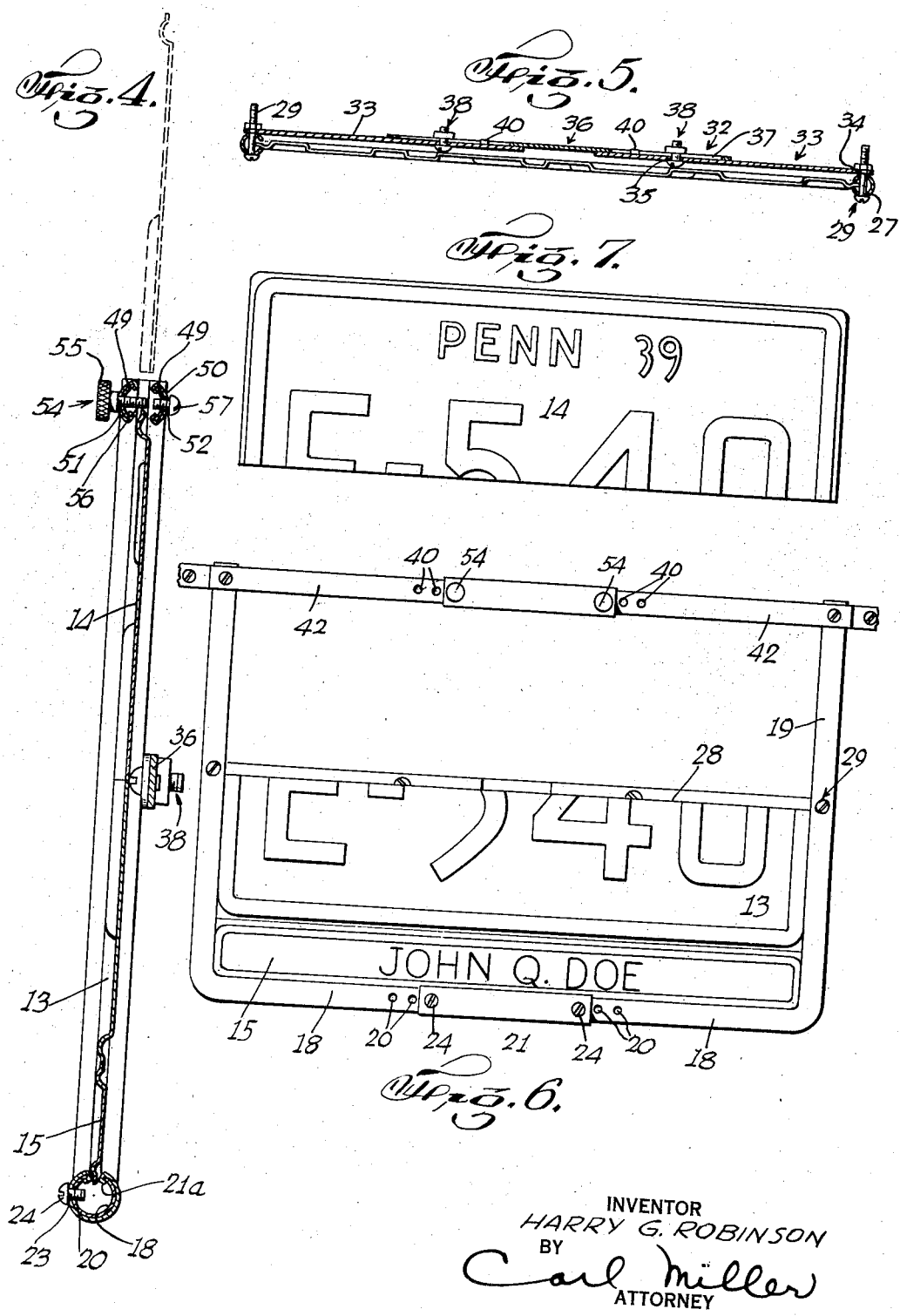

2,212,403

UNITED STATES PATENT OFFICE 2,212,403

LICENSE TAG AND FRAME HOLDER THEREFOR

Harry G. Robinson, Patton, Pa.

Application November 1, 1939, Serial No. 302,381

3 Claims. (Cl. 40—2.2)

This invention relates to license tags and frame holders therefor. It is particularly directed to license tags for automobiles, trucks or busses, and holders therefor adapted to permit easy removal of the license tag.

An object of this invention is to provide a license tag which is made up of two sections, a lower section and an upper section, and a frame to hold the same, the frame being so constructed as to enable the owner or lawful operator of the automobile to readily remove the upper section of the license tag whenever desired, particularly when the car is parked, thereby giving notice to anyone in the event that an unlawful operator should attempt to drive the car away, since in such case, only the lower portion of the tag will be seen, the upper portion having been removed from the license frame or holder.

A further object of this invention is to provide a strong, rugged and compact license tag and holder therefor of the character described, which shall be relatively inexpensive to manufacture, comprise few and simple parts, which shall be easy to assemble, and which will permit easy removal of the upper section of the tag, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of a license tag or plate holder, and license tag carried thereby, embodying the invention;

Fig. 2 is a top edge view of the structure shown in Fig. 1;

Fig. 3 is a rear elevational view of the improved construction shown in Fig. 1;

Fig. 4 is a cross-sectional view taken on line 4—4 of Fig. 1;

Fig. 5 is a cross-sectional view taken on line 5—5 of Fig. 1;

Fig. 6 is a front elevational view of the license tag' holder, and the lower section of the tag, with the upper section of the tag removed; and Fig. 7 is a front elevational view of the upper section of the tag.

Referring now in detail to the drawings, 10 designates a device embodying the invention, comprising a license tag 11 and a frame or holder 12 therefor. The license tag 11 may comprise a lower section 13 and an upper section 14, complementary thereto. On the lower section is marked the lower half of the license number, and on the upper section is marked the upper half of the license number, so that when the sections are placed together, as shown in Fig. 1 of the drawings, the license numbers may be read.

An auxiliary plate or tag 15 may be mounted in the holder 12, below the license tag 11, on which is marked the name of the automobile owner. The license tags 11 and 15 may be made of sheet metal and have the same width.

The frame or holder 12 comprises a pair of similar, symmetrically disposed, L-shaped members 17 each having an inwardly extending horizontal leg 18, and an upwardly extending vertical leg 19. The members 17 are of split tubular construction, the leg 18 having a slot at the top thereof, and the leg 19 having a slot on the inner side thereof. Each of the legs 18 is formed with a plurality of equally spaced screw threaded openings 20 adjacent the inner end thereof.

Slidably receiving the inner ends of said legs 18, and telescoping therewith, is a split tubular sleeve 21 having inturned edges 21a, receiving the longitudinal edges of the leg 18. Sleeve 21 is formed with an opening 23 on each end. The openings 23 are adapted to selectively register with the openings 20, and extending through the registering openings, are screws 24 for attaching the outer ends of the sleeve 21 to the legs 18 in various adjusted positions. Thus, the distance between the vertical legs 19 may be regulated.

The name plate or tag 15 may be slipped into frame member 17 from the top, the outer edges of the plate and the bottom ends thereof passing through the slots in the legs 18 and 19. After the plate 15 has been placed in position, the lower section 13 of the license tag 11 may likewise be slipped into position, to contact the upper edge of the plate 15, with the outer edges of sections 13 received within the slots of legs 19. After the lower section 13 is in place, the upper section 14 may likewise be slipped into place, so that the lower edge of the upper section 14 contacts the upper edge of the lower section 13. The outer edges of section 14 likewise are received in the slots of legs 19.

Means is provided to securely hold the lower section 13 in the frame. To this end, each of the legs 19 is provided with a pair of registering openings 27 at the level of the upper edge 28 of lower section 13. Through each of the registering openings 27 is a bolt 29. The upper corners of the lower section 13 are preferably rounded, as at 30, and the bolts 29 engage said corners to retain the lower section within the frame holder.

Carried by the bolts 29 is an extensible transverse connecting member 32. Member 32 comprises a pair of similar, symmetrically disposed, strips 33 each formed with an opening 34 at its outer end through which the bolt 29 passes. Each member 33 is formed with an opening 35 adjacent its inner end. Interconnecting the members 33 is a strip 36 formed with longitudinal slots 37 at its outer end. Extending through each opening 35 and slot 37, is a bolt 38.

It will now be understood that by loosening the bolts 38, the length of the connecting member 32 may be varied.

On each member 33 is a lug 40 extending into one of the slots 37, serving to retain the strips and 36 in longitudinal alignment.

It will now be noted that the connecting member 32 is disposed in back of the license tags, and is therefore hidden from view.

Means is provided to removably retain the upper section 14 within the holder. To this end, the upper ends of legs 19 are formed with registering through openings through which there passes a bolt 40a. Interconnecting the upper ends of the legs 19 and mounted on the bolts 40a, is a connecting member 41. The connecting member 41 comprises a pair of similar, symmetrically disposed, members 42 having mutually contacting portions 43 disposed beyond one of the legs 19, and attached together by a bolt 44. Members 42 also comprise substantially semi-cylindrical portions 45 extending from the portions 43 and surrounding the leg 19, and formed with registering openings through which the bolt 40a passes. The members 42 further comprise longitudinal portions 47 of somewhat less than semi-cylindrical cross-section extending from the portions 45. The portions 47 of members 42 are each formed with a plurality of spaced openings 49.

As shown in the drawing, a pair of members 42 are connected to each of the legs 19. The inner ends of members 42 are interconnected by a pair of similar, symmetrically disposed, sleeves 50 having turned over longitudinal edges slidably receiving the upper and lower edges of portions 47 of said members 42. Members 50 are formed with aligned openings 51 and 52 adapted to selectively register with the openings 49, whereby the overall length of the connecting member 41 may be regulated.

Extending through the openings 51 and the openings 49 registering therewith, are screws 54 having knurled heads 55 and shanks 56 adapted to overlap the upper edge of tag section 14. Extending through the openings 52 and the openings 49 registering therewith, are screws 57 having relatively short shanks.

It will now be understood that to permit removal of the upper section 14, it is merely necessary to loosen or retract the screws 54.

It will be understood that if desired, the license tag 11 may be made in one piece, in which event, the bolts 29 and the connecting member 32 may be omitted.

Where the split tag is used, the owner or lawful operator of the automobile may readily remove the upper section of the license tag whenever desired, particularly when the car is parked, thereby giving notice to anyone in the event that an unlawful operator should attempt to drive the car away, since in such case, only the lower half of the tag will be seen.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a frame comprising a pair of L-shaped members, each having an inwardly extending horizontal leg, and an upwardly extending vertical leg, a sleeve receiving the inner ends of said horizontal legs, means for attaching said sleeve to said legs in various adjusted positions, an extensible member interconnecting the upper ends of said upwardly extending legs, a license tag mounted within said frame, said extensible member being provided with means to retain the license tag within said frame, and a horizontal extensible connecting member interconnecting the mid portions of said upwardly extending legs.

2. In combination, a frame comprising a pair of similar, symmetrically disposed, L-shaped members each having a horizontal inwardly extending leg, and a vertical upwardly extending leg, said horizontal legs having slots on the upper sides thereof, and said upwardly extending legs having slots on the inner sides thereof, a sleeve telescoped with the inwardly extending legs of said L-shaped members, each of said inwardly extending legs being formed with a plurality of openings, said sleeve having an opening at each end adapted to register with the openings in said legs, screws extending through the registering openings of said sleeve, and inwardly extending legs, to interconnect said L-shaped members in various adjusted positions, a split license tag mounted on said L-shaped members and comprising an upper section and a lower section, a pair of bolts on the mid portions of said upwardly extending legs engaging the lower section to retain the same on the frame, an extensible member interconnecting said bolts, and an extensible member interconnecting the upper ends of said upwardly extending legs, and means on said last mentioned extensible member to retain the upper section within said frame.

3. In combination, a frame comprising a pair of similar, symmetrically disposed, L-shaped members each having a horizontal inwardly extending leg, and a vertical upwardly extending leg, said horizontal legs having slots on the upper sides thereof, and said upwardly extending legs having slots on the inner sides thereof, a sleeve telescoped with the inwardly extending legs of said L-shaped members, each of said inwardly extending legs being formed with a plurality of openings, said sleeve having an opening at each end adapted to register with the openings in said legs, screws extending through the registering openings of said sleeve, and inwardly extending legs, to interconnect said L-shaped members in various adjusted positions, a split license tag mounted on said L-shaped members and comprising an upper section and a lower section, a pair of bolts on the mid portions of said upwardly extending legs engaging the lower section to retain the same on the frame, an extensible member interconnecting said bolts, and an extensible member interconnecting the upper ends of said upwardly extending legs, and means on said last mentioned extensible member to retain the upper section within said frame, said last means being adjustable to permit removal of the upper section.

HARRY G. ROBINSON.